United States Patent
Yamane et al.

[19]

[11] Patent Number: 5,875,004
[45] Date of Patent: Feb. 23, 1999

[54] IMAGE PROCESSING INSPECTION APPARATUS

[75] Inventors: Toshiki Yamane, Sakai; Hisato Taniwaki, Nara; Yoshimasa Fujiwara, Hirakata; Masayuki Hattori, Shijonawate; Takayoshi Akiyama, Yokohama, all of Japan

[73] Assignee: Matsushita Electric Works, Ltd., Osaka, Japan

[21] Appl. No.: 893,518

[22] Filed: Jul. 11, 1997

[30] Foreign Application Priority Data

Jul. 15, 1996 [JP] Japan ................................. 8-185175

[51] Int. Cl.$^6$ .................................................. H04N 5/268
[52] U.S. Cl. ............................................ 348/705; 345/508
[58] Field of Search ................................ 348/86, 87, 126, 348/705, 706, 185, 190; 382/141, 182; 345/507, 508, 509, 199

[56] References Cited

U.S. PATENT DOCUMENTS

| | | | |
|---|---|---|---|
| 4,498,081 | 2/1985 | Fukushima et al. ..................... | 340/793 |
| 4,716,460 | 12/1987 | Benson et al. ........................... | 348/705 |
| 4,816,915 | 3/1989 | Imai et al. ............................... | 348/706 |
| 5,162,903 | 11/1992 | Ogino et al. ............................ | 348/705 |
| 5,173,777 | 12/1992 | Dangschat ............................... | 348/706 |
| 5,220,425 | 6/1993 | Enari et al. .............................. | 348/705 |
| 5,369,441 | 11/1994 | Enari ....................................... | 348/706 |
| 5,369,713 | 11/1994 | Schwartz et al. ........................... | 382/8 |
| 5,481,619 | 1/1996 | Schwartz et al. ....................... | 382/141 |

FOREIGN PATENT DOCUMENTS

| | | |
|---|---|---|
| 7234934 | 9/1995 | Japan . |
| 8043053 | 2/1996 | Japan . |

OTHER PUBLICATIONS

Partial English Language Translation of JP–7–234934.
Partial English Language Translation of JP–8–043053.

*Primary Examiner*—Bryan Tung
*Assistant Examiner*—Shawn An
*Attorney, Agent, or Firm*—Greenblum & Bernstein P.L.C.

[57] ABSTRACT

An image processing inspection apparatus comprises a TV camera, a plurality of image-processing-use image memories which are provided for a plurality of screen frames, a plurality of display-use image memories which are provided for a plurality of screen frames, a display monitor, a CPU and a switch for selectively connecting for each screen frame one of the image-processing-use image memories with the TV camera and the CPU, and one of the display-use image memories with the TV camera and the display monitor.

9 Claims, 9 Drawing Sheets

IMAGE PROCESSING INSPECTION APPARATUS

FIELD OF THE INVENTION

The present invention relates to an image processing inspection apparatus used as production equipment for industrial uses in judging the quality of products in manufacturing processes.

BACKGROUND OF THE INVENTION

Lately, an increasing number of image processing inspection apparatuses have been introduced as production equipment into factories and the like for the purpose of correctly, speedily and automatically executing a variety of visual inspections which have relied on the human visual sense. For example, image processing inspection apparatuses are disclosed in Japanese Patent Laid-open Publication Nos. 7-234934 and 8-043053.

Figure 15:
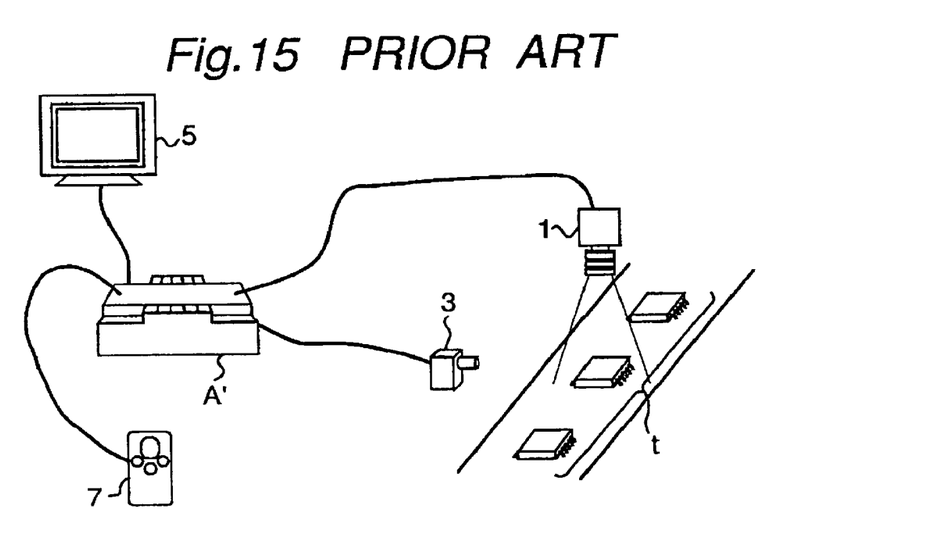
FIG. 15 is a schematic diagram of an inspection system employing a prior art image processing inspection apparatus.

FIG. 15 is a view for explaining a state in which products are inspected by an image processing inspection apparatus. As shown in FIG. 15, the image processing inspection apparatus A' is connected to a TV camera 1 for grabbing an image, a display monitor 5 for displaying the image or the like of the product on the way to inspection and a keypad 7 for performing operations such as various setting operations. The image processing inspection apparatus A' grabs the image of a product (referred to as a target hereinafter) t which is on the way to production and is treated as an object to be measured while being conveyed on a production line in the form of an image signal from the TV camera 1 in accordance with a timing at which an external trigger input from a sensor 3 or the like is inputted. Subsequently, the image processing inspection apparatus A' executes various image processing operations such as position correction, area measurement and barycentric position calculation on the grabbed image, executes numerical calculations with the obtained various results, executes logical calculations for a go/no-go check with the obtained values and then outputs the result. The image processing inspection apparatus A' generally executes the above series of calculation and outputting processes.

Normally, a time from the start of grabbing the image to the completion of all the inspection processes in readiness for the process of grabbing the next image is generally called the inspection time.

The prior art image processing inspection apparatus A' has executed the process of grabbing image data from the TV camera 1 into an image data memory for image grabbing and continuously executed a series of calculation and outputting processes after the completion of the image grabbing. Furthermore, the prior art image processing inspection apparatus has required a specified time for image grabbing, e.g., 33.3 ms in the case of frame image grabbing or 16.7 ms in the case of field image grabbing. In the case where the processing is executed continuously as described above, the inspection time has not been allowed to be reduced further than the time of "image data grabbing time" plus "image processing time plus calculation and output processing time" even when a tact for the inspection is short (i.e., when the inspection must be completed in a short time).

Figure 16:
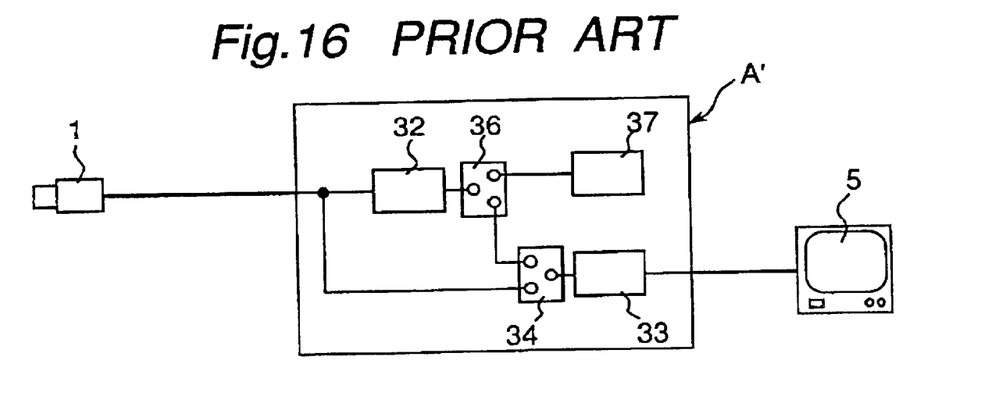
FIG. 16 is a schematic diagram of the prior art image processing inspection apparatus.

FIG. 16 shows a schematic diagram of hardware of the prior art image processing inspection apparatus. The image processing inspection apparatus A' is comprised of an image data memory 32, a display use output circuit 33, an image processing use circuit 37 and selection switch circuits 34 and 36. In this apparatus, image data from the TV camera 1 is grabbed into the image data memory 32 and simultaneously inputted to the display use output circuit 33 via the selection switch circuit 34, where separately set data from a graphic data memory (not shown) is superimposed on the above data at need and the resulting data is outputted to a display means such as the display monitor 5. The image data grabbed in the image data memory 32 is outputted to the image processing use circuit 37 via the selection switch circuit 36, and the image processing use circuit 37 executes various measurements of the position, shape and so forth of the target based on this image data so as to execute the go/no-go check of the target. Further, the image data grabbed in the image data memory 32 can be outputted to the display use output circuit 33 via the selection switch circuits 36 and 34 and displayed on the display monitor 5.

Figure 17:
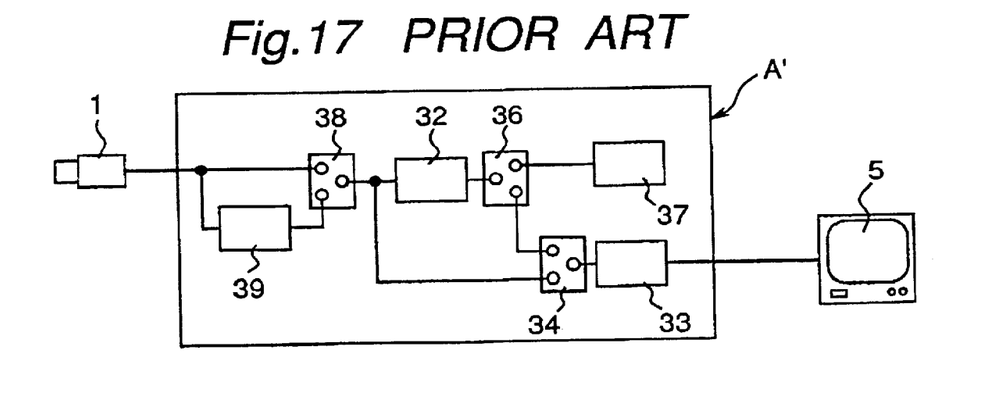
FIG. 17 is a schematic diagram of an image processing inspection apparatus of another prior art.

Furthermore, the image data from the TV camera 1 is required to be displayed as, for example, binarized in the inspection process. In this case, as shown in FIG. 17, the image processing inspection apparatus A' is required to have an arrangement in which a binarizing circuit 39 for binarizing the image data from the TV camera 1 is provided for allowing the selection between the image that is binarized and the image that is not binarized by means of a selection switch circuit 38 or prepare a means for converting the image data grabbed in the image data memory 32 into binarized data and thereafter outputting the resulting data to the display output circuit 33.

As described above, the prior art image processing inspection apparatus has the problem that the inspection time cannot be reduced and the problem that a special circuit is necessary in the case where the image is displayed as processed, e.g., in the case where the grabbed image is displayed as binarized.

The present invention has been developed in view of the above points and it has an object to provide an image processing inspection apparatus capable of reducing the inspection time and setting a variety of inspection process and display modes with a simple construction.

SUMMARY OF THE INVENTION

In order to achieve the above object, the present invention provides an image processing inspection apparatus having a TV camera, a plurality of image-processing-use image memories which are provided for a plurality of screen frames and each of which operates to store image data of each screen frame grabbed from said TV camera for use in a specified inspection process, a plurality of display-use image memories which are provided for a plurality of screen frames a each of which operates to store image data of each screen frame grabbed from said TV camera for use in being displayed, a display monitor for displaying the image data stored in one of said display-use image memories, a CPU for executing specified image processing on the data stored in one of said image-processing-use image memories and a switch means for selectively connecting for each screen frame one of said image-processing-use image memories with said TV camera and said CPU, and one of said display-use image memories with said TV camera and said display monitor. With this arrangement, a variety of inspection process and display modes can be set and each inspection process can be executed at higher speed by virtue of the provision of the image data storing time.

The above image processing inspection apparatus may be provided with the display-use image memories for two screen frames and allow the switch means to execute switching between a period in which one display-use image memory is connected to the TV camera for the execution of image data storing and the other display-use image memory is simultaneously connected to the display monitor for the execution of image display and a period in which the other display-use image memory is connected to the TV camera for the execution of image data storing and the one display-use image memory is simultaneously connected to the display monitor for the execution of image display. With this arrangement, image display can be executed virtually by the raw image data from the TV camera.

Furthermore, the-above image processing inspection apparatus may be provided with a graphic data memory which stores therein graphic data to be displayed as superimposed on the image data stored in the display-use image memory and a look-up table having a plurality of data conversion means which are selected in an alternative way and operate to superimpose the graphic data stored in the graphic data memory on the image data to be displayed. In this case, it is acceptable to make each data conversion means have setting data which can be arbitrarily set and corresponds to the type of conversion in the look-up table and select the desired data conversion means in an alternative way, thereby controlling the type of the display image. With this arrangement, an arbitrary display pattern can be obtained by combining the image data with the graphic data.

Furthermore, in the above image processing inspection apparatus, the look-up table may include a data conversion means for displaying the image data by binarizing the data and a data conversion means for displaying the image date in the form of a gray scale image. With this arrangement, it can be easily achieved to form the display image into a binarized image or a gray scale image without providing any special circuit.

Furthermore, in the above image processing inspection apparatus, the look-up table may rewrite the data conversion means in order to obtain a desired data conversion format.

Furthermore, the above image processing inspection apparatus may store the image data into one image-processing-use image memory and simultaneously executes an inspection process by means of another image-processing-use image memory in which the image data in the preceding time has been stored. In this case, the plurality of image-processing-use image memories are used as sequentially cyclically switched, so that the inspection time can be reduced by the provision of the image storing time.

Furthermore, the above image processing inspection apparatus may be provided with a means for setting a mode by switching between a normal mode in which the image data is stored into the image-processing-use image memory and an inspection process is executed after the storing is completed, an alternate mode in which the image data is stored into one image-processing-use image memory and an inspection process is executed simultaneously by means of another image-processing-use image memory in which the image data in the preceding time has been stored and a through display mode in which the image data from the TV camera is selectively stored into the display-use image memory for a plurality of screen frames and, while the image data is being stored, the image data stored in the display use-image memory in which the image data in the preceding time has been stored is displayed on the display monitor. With this arrangement, the image processing inspection apparatus is allowed to have a variety of operative functions.

Furthermore, the above image processing inspection apparatus may copy the image data stored in the image-processing-use image memory into the display-use image memory and thereafter display the image data copied into the display-use image memory when the through display mode is switched to the alternate mode or the normal mode. Furthermore, in the through display mode, there is executed control so that the image data from the TV camera is stored into only the display-use image memory and not stored into the image-processing-use image memory. Therefore, by switching the display mode in a manner as described above, the image that has been displayed in the memory display mode before the switching to the through display mode can be displayed when switching the through display mode to the memory display mode.

Furthermore, according to the above image processing inspection apparatus, when a signal requiring the start of the inspection process is externally inputted while the image data stored in the image-processing-use image memory is copied into the display-use image memory, it is acceptable to stop the copying and store the next image data transmitted from the TV camera in the image-processing-use image memory and the display-use image memory. With this arrangement, when there is a request for starting the inspection process on the way to the copying, the inspection process can be started without delay.

DETAILED DESCRIPTION OF THE PREFERRED EMBODIMENTS

Preferred embodiments of the image processing inspection apparatus of the present invention will be described below with reference to the accompanying drawings. It is to be noted that the image processing inspection apparatus described in each of the following embodiments is a substitute for the image processing inspection apparatus A' having the inspection system construction shown in FIG. 15.

First Embodiment

Figure 1:
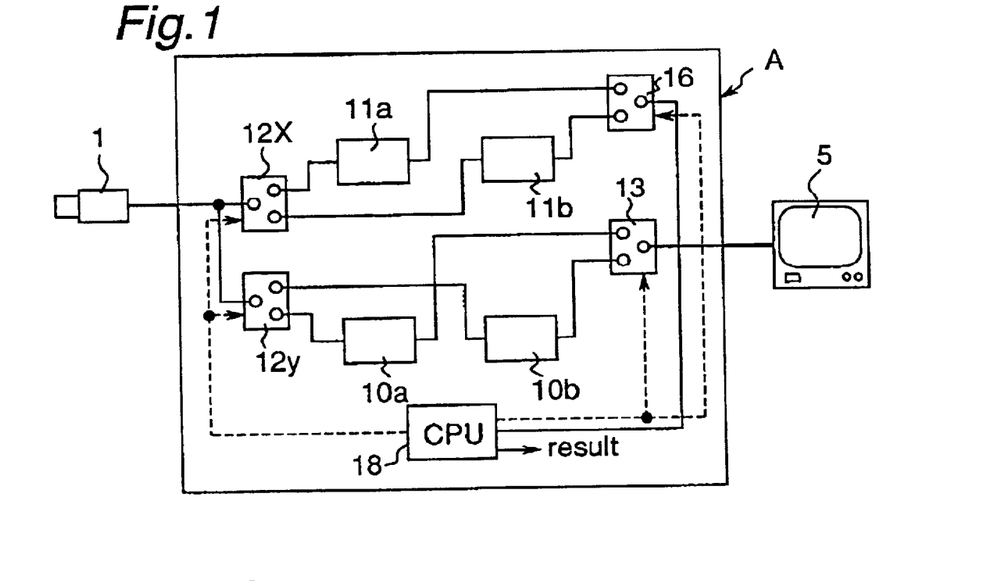
FIG. 1 is a schematic diagram of an image processing inspection apparatus according to a first embodiment of the present invention.

FIG. 1 is a schematic diagram of an image processing inspection apparatus according to a first embodiment. The image processing inspection apparatus A is provided with image processing use image data memories 11a and 11b (each referred to as a "processing image memory" hereinafter) for two screen frames, display use image data memories 10a and 10b (each referred to as a "display image memory" hereinafter) for two screen frames, selection switch circuits 12x, 12y, 13 and 16 and a CPU 18 used for image processing and totally controlling the operation and so forth of the present apparatus. The processing image memories 11a and 11b are connected to a TV camera 1 via the selection switch circuit 12x and connected to the CPU 18 via the selection switch circuit 16. The display image memories 10a and 10b are connected to the rig camera 1 via the selection switch circuit 12y and connected to a display monitor 5 via the selection switch circuit 13.

In this case, it is postulated that the TV camera 1 outputs image data obtained after converting the picked-up image into digital data, and the display monitor 5 processes the image of the inputted digital data for specified processing such as an analog-to-digital conversion process and thereafter displays the image. The actual image processing inspection apparatus includes a circuit for executing specified processing for storing the image data from the TV camera 1 into the image data memories, a circuit for executing specified signal processing before outputting the data from the image memories to the display monitor 5, other control circuits and so forth. In this case, it is postulated that these techniques are implemented by the known ones, and these circuits which have no direct relation with the present invention are not shown in FIG. 1 for the simplicity of explanation and only the essential part of the present invention is shown. In this regard, the same thing can be said for the embodiments described later.

The operation of the image processing inspection apparatus A constructed as above will be described below In FIG. 1, the processing image memory 11a and display image memory 10a are paired with each other, while the processing image memory 11b and the display image memory 10b are paired with each other. Each pair is selected by the switching of the selection switch circuits 12x and 12y, and the image data memories for processing use and display use constituting a pair are simultaneously connected to or disconnected from the TV camera 1 or the display monitor 5.

Further, when the processing image memories 11a and 11b are disconnected from the TV camera 1, image data stored in the processing image memories 11a and 11b are read by the CPU 18, and specified image processing and calculation processing for the inspection process are executed. When the inspection process by the image data is completed, the CPU 18 outputs an inspection result. Based on this inspection result, the go/no-go check of the target can be executed, thereby allowing a specified message to be displayed on the display monitor 5, allowing an alarm device to be operated and allowing specified processing such as removal of a effective target on the line to be executed. When the display image memories 10a and 10b are disconnected from the TV camera 1, the selection switch circuit 13 is switched, so that the memories 10a and 10b are connected to a display circuit (not shown) comprised of a D/A converter and so forth of the display monitor 5.

The switching of the selection switch circuits 12x, 12y and 13 is controlled by the CPU 18 which executes image processing, calculation processing and so forth.

Further, by the switching of the selection switch circuits 12x and 12y, the pair of the image data memories 10a and 11a and the pair of the image data memories 10b and 11b are alternately connected to the TV camera 1. In this stage, the image data from the TV camera 1 is stored into the images data memories 10a and 11a (or 10b and 11b) connected to the TV camera 1. At the same time, among the image data memories 10b and 11b (or 10a and 11a) which are not connected to the TV camera 1, the image data stored in the processing image memory 11b (or 11a) is read by the CPU 18 and subjected to specified image processing. Thus, among the various measurements of the position, shape and so forth, the pre-programmed measurement, i.e., the inspection process is executed. At the same time, the image data stored in the display image memory 10b (or 10a) paired with the processing image memory 11b (or 11a) is transferred to the display circuit of the display monitor 5 via the selection switch circuit 13 and displayed in the form of an image on the display monitor 5.

Figure 2A:
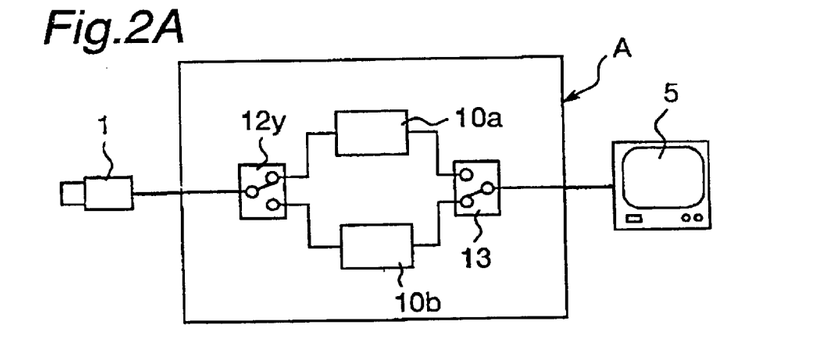
FIGS. 2A and 2B are views for explaining the operation of the image processing inspection apparatus of the first embodiment when selection switches are switched.

FIG. 2A shows a state in which the selection switch circuit 12y is switched to the display image memory 10a side. In this state, the image data from the TV camera 1 is stored into the display image memory 10a. During this time, the selection switch circuit 13 is switched to the display image memory 10b side, and the image data stored in the display image memory 10b is transferred to the display monitor 5 and displayed in the form of an image.

Figure 2B:
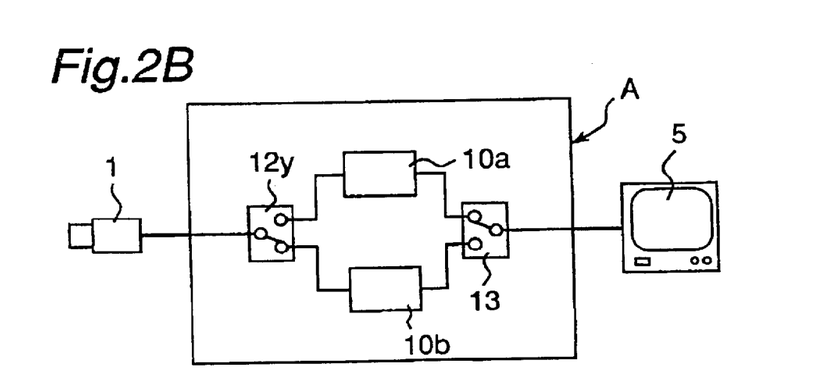

Fig,. 2B shows a state in which the selection switch circuit 12y is switched to the display image memory 10b side. In this state, the image data from the TV camera 1 is stored into the display image memory 10b . During this time, the selection switch circuit 13 is switched to the display image memory 10a side, and the image data stored in the display image memory 10a is transferred to the display monitor 5 and displayed in the form of an image.

As described above, according to the present embodiment, while the inspection process and display are executed on the basis of the image data stored in one pair of the image data memories 10a and 11a (or 10b and 11b), the image data from the TV camera 1 is simultaneously stored into the other pair of the image data memories 10b and 11b (or 10a and 11a) Subsequently, when the image processing of the image data stored in the image data memories 10a and 11a (or 10b and 11b) is completed, the inspection process and display are executed by means of the image data stored in the pair of the image data memories 10b and 11b (or 10a and 11a), and the image data from the TV camera 1 is simultaneously stored into the pair of image data memories 10a and 11a (or 10b and 11b).

Thus, the image processing inspection apparatus of the present embodiment can virtually display the raw image from the TV camera 1 on the display monitor 5 by alternately switching the pair of image data memories which store image data and the pair of image data memories whose data are read for the processing and display by means of the selection switch circuits 12x, 12y and 13. Furthermore, while thee inspection process is executed by means of the image data of one processing image memory 11a (or 11b), the image data storing is executed by means of the other processing image memory 11b (or 11a). Therefore, the time required for the inspection process can be reduced by the image data storing time.

Second Embodiment

Figure 3:
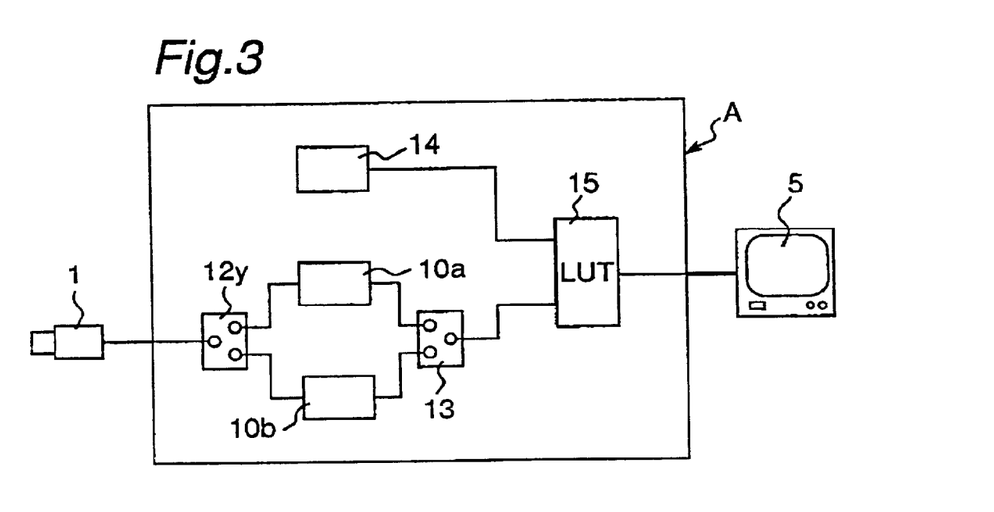
FIG. 3 is a schematic diagram of an image processing inspection apparatus according to a second embodiment of the present invention.

FIG. 3 shows a schematic diagram of an image processing inspection apparatus according to a second embodiment.

The image processing inspection apparatus of the present embodiment is constructed by further providing the image processing inspection apparatus of the first embodiment shown in FIG. 1 with a graphic data memory 14 which stores therein image data of specified characters, patterns and so forth to be displayed on the display monitor 5 and a look-up table 15 for data conversion use. In FIG. 3, only the essential part is shown for convenience of explanation. That is, circuits relevant to the processing image memories 11a and 11b have the same circuit construction as that shown in FIG. 1 of the first embodiment, and only the circuit construction relevant to the display image memories 10a and 10b is only shown in FIG. 3.

The data conversion use a look-up table (referred to as an LUT hereinafter) 15 is provided for the purpose of generating image data to be displayed on the display monitor 5 by superimposing the output from the graphic data memory 14 on the image data from the display image memory 10a (or 10b).

In this case, as described above, the LUT 15 of the present embodiment has a function for combining the graphic data (having a width of, for example, four bits) read from the graphic data memory 14 on the image data read from the display image memory 10a (or 10b) and converting the resulting data into display use data. The converted display use data is subjected to digital-to-analog conversion by the display circuit of the display monitor 5 and displayed in the form of an image on the display monitor 5.

In this case, the LUT 15 is comprised of a plurality of banks. Each bank corresponds to a data conversion pattern, and a specified bank is selected according to the required data conversion. The data conversion pattern of the bank is determined by data setting, and this data setting can be arbitrarily set according to user's need.

For example, by presetting binarized display use data or gray scale display use data in a specified bank of the LUT 15 and selecting the bank to be used at need, the binarized image or the gray scale image can be displayed on the display monitor 5.

Figure 4:
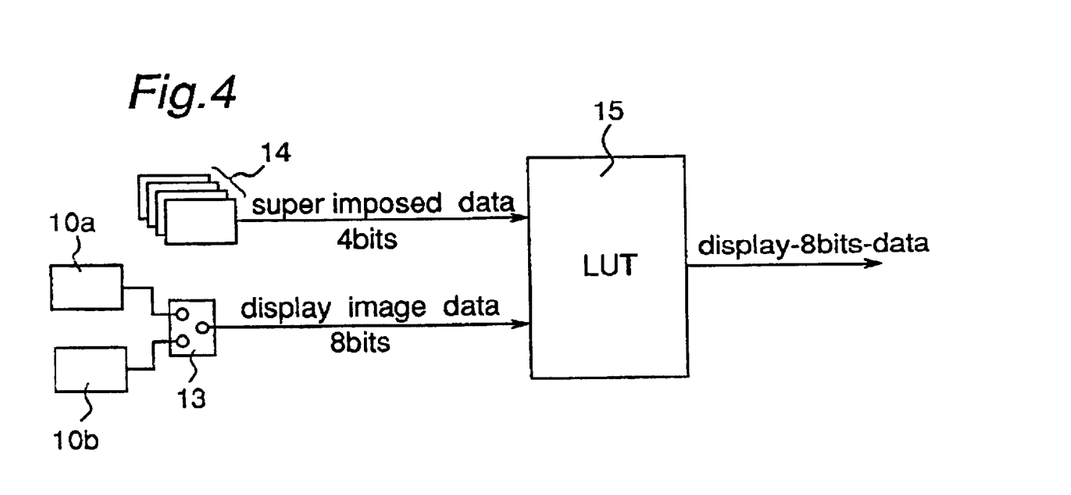
FIG. 4 is an explanatory view of the construction of a display use look-up table.

FIG. 4 is a diagram for explaining the operation of the LUT 15. As shown in FIG. 4, the LUT 15 combines displays use image data having a data width of eight bits, i.e., the image data from the display image memory 10a (or 10b) with the data having the data width of four bits, i.e., the data from the graphic data memory 14 so as to convert the data into display use 8-bit data. This converted 8-bit data is subjected to digital-to-analog conversion by the display circuit in the final stage and displayed on the display monitor 5.

Figure 5:
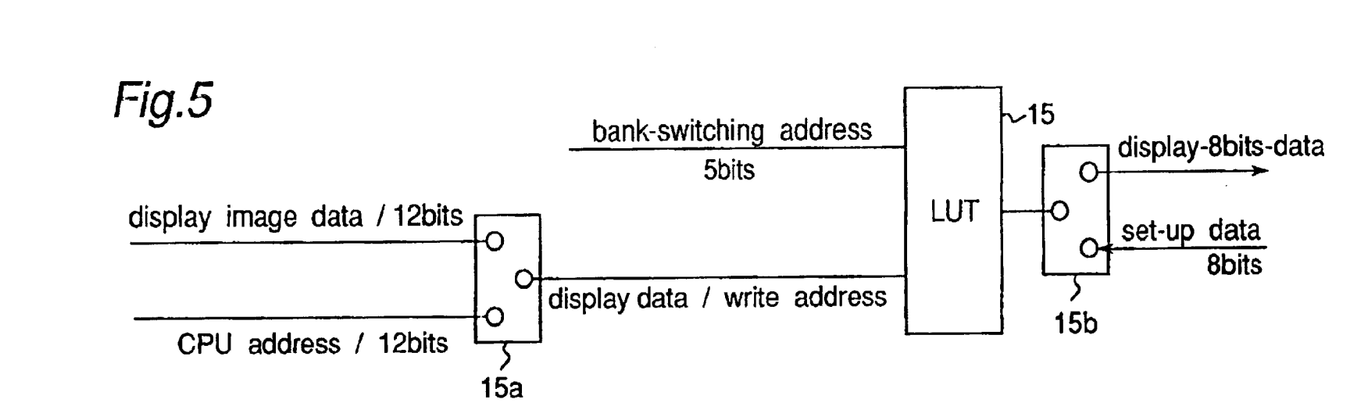
FIG. 5 is a block diagram of a concrete example of the display use look-up table.

FIG. 5 shows a concrete example of the LUT 15. In this case, the LUT 15 has sixteen banks of the binarized image display use image memory and sixteen banks of the gray scale image display use image memory. In this case, 4-frame overlay display can be achieved every display of the binarized image display and the gray scale image display (a total of sixteen (=2 2 2 2) banks are required for turning on and off each of the 4-frame overlay display screens).

The LUT 15 executes bank switching by receiving a bank switching address of a total of five bits consisting of four bits for bank switching and one bit for switching between the gray scale image display and binarized image display. Further, display image data of a total of twelve bits consisting of the image data (eight bits) from the display image memory 10a (or 10b) and the graphic data (four bits) from the graphic data memory 14 is handled as a write address for the LUT 15 designated by the address from a 12-bit address bus connected to the CPU 18. In this stage, the above address or display image data to be inputted to the LUT 15 is selected by a selection switch circuit 15a. Further, the input of the data setting use write data (eight bits) or the output of the display use 8-bit data to the display monitor 5 is selected by a selection switch circuit 15b.

Therefore, when the contents of the display use image data memory are displayed on the display monitor 5, the switches are switched so that the display image data is selected by the selection switch circuit 15a and the display use 8-bit data is outputted by the selection switch circuit 15b. When the CPU 18 changes the data setting of the LUT 15, the switches are switched so that the write address is selected by the selection switch circuit 15a and the setting data is inputted by the selection switch circuit 15b.

Third Embodiment

Figure 6:
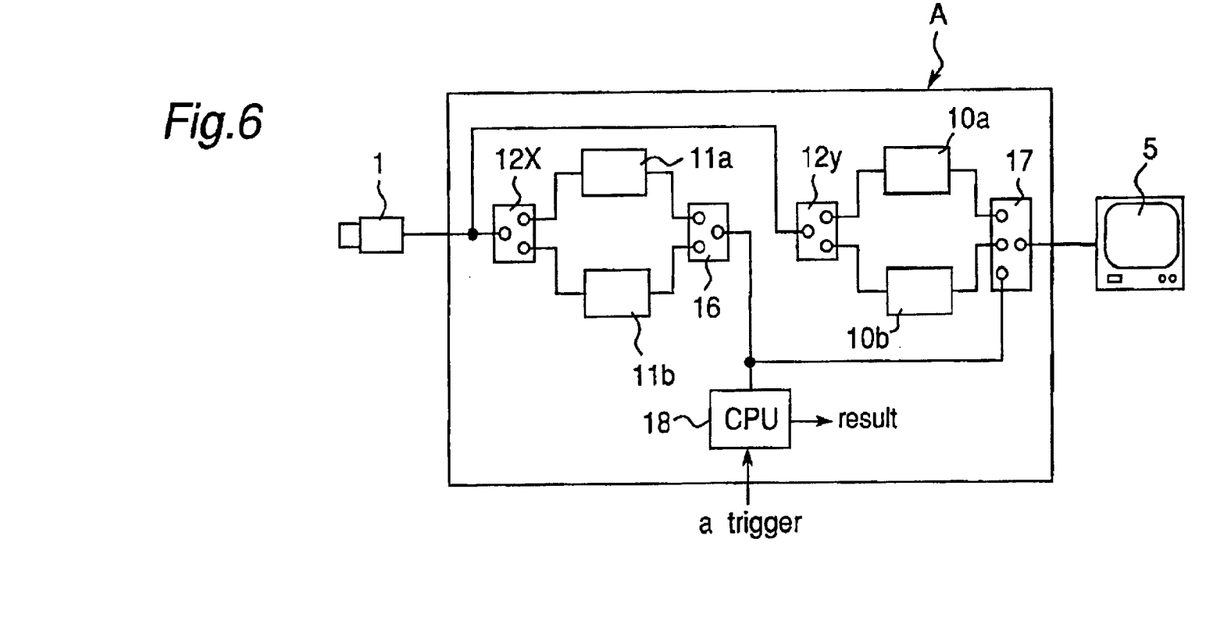
FIG. 6 is a schematic diagram of an image processing inspection apparatus according to a third embodiment of the present invention.

FIG. 6 shows a schematic diagram of an image processing inspection apparatus according to a third embodiment. The image processing inspection apparatus A of the present embodiment is provided with processing image memories 11a and 11b for two screen frames and display image memories 10a and 10b for two screen frames similarly to the first embodiment, and the image data of the display image memory 10a or 10b is transferred to the display monitor 5 via a selection switch circuit 17 and displayed in the form of an image.

Further, the image processing inspection apparatus of the present embodiment has three operation modes. That is, the apparatus has (1) an alternate mode, (2) a normal mode and (3) a through display mode, and there modes are selected in an alternative way by the CPU 18 according to a request issued from the user by means of a keypad 3 or the like. The operation of the image processing inspection apparatus in each mode will be described below.

(1) Alternate mode

In the alternate mode, simultaneously with storing an image in one of the two processing image memories 11a and 11b provided for two screen frames, the inspection process is executed by means of the other processing image memory that has stored therein the preceding image similarly to the first embodiment. By this operation, the inspection can be executed faster than the prior art image processing inspection apparatus by the image data storing time. Furthermore, if a series of inspections are completed within the image data storing time, the inspection can be executed every image data storing time, which is a characteristic of this mode. The operation will be described in concrete below.

Figure 7A:
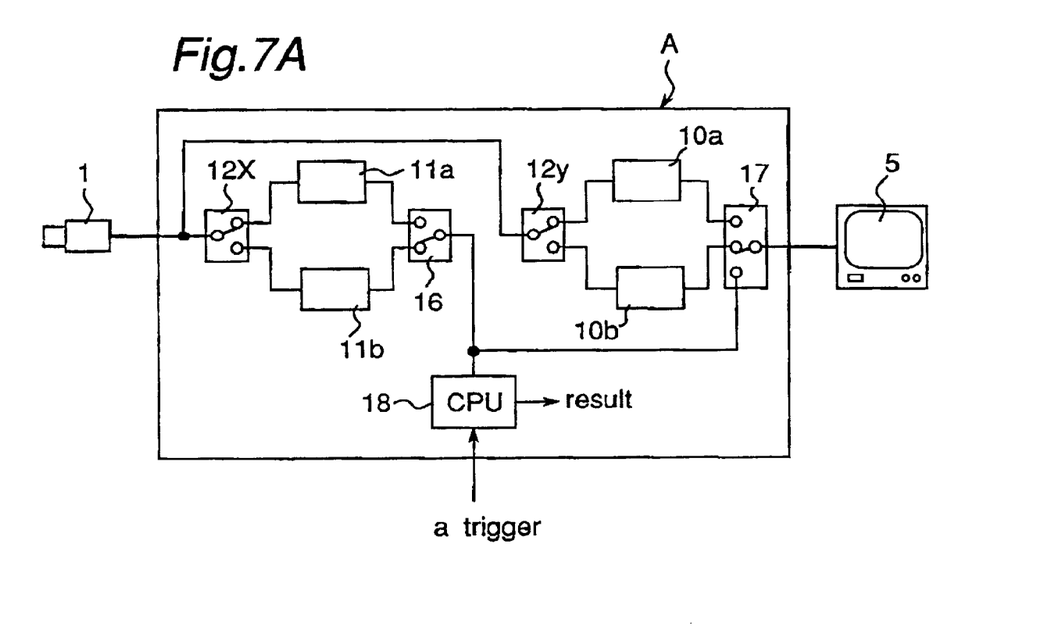
FIGS. 7A and 7B are views for explaining the operation of the image processing inspection apparatus of the third embodiment when selection switches are switched.

First, when an inspection start request signal is inputted to the external trigger input of the CPU 18 which executes signal processing and control processing of the image processing inspection apparatus A, the selection switch circuits 12x, 12y, 16 and 17 are switched under the control of the CPU 18 in a manner as shown in FIG. 7A, and the image data from the TV camera 1 is simultaneously stored into the processing image memory 11a and the display image memory 10a. In this case, the inspection start request signal is outputted when the target is detected in a specified inspection position on the line by the sensor 3. It, therefore, represents the fact that the target is located in an inspectable position. While image data are being stored into the image data memories 10a and 11a, the CPU 18 reads the image data stored in the processing image memory 11b via the selection switch circuit 16 and executes the inspection process including image processing, calculation and outputting process and so forth. Further, during this time, the image data stored in the display image memory 10b is inputted to the display monitor 5 via the selection switch circuit 17 and displayed on the display monitor 5.

It is to be noted that no image data has not been stored yet in the processing image memory 11b and the display image memory 10b when the inspection start request signal is firstly inputted. Therefore, neither inspection process nor display is executed by means of the image data stored in both the processing image memory 11b and display image memory 10b in the image data storing period of the processing image memory 11a and the display image memory 10a.

Figure 7B:
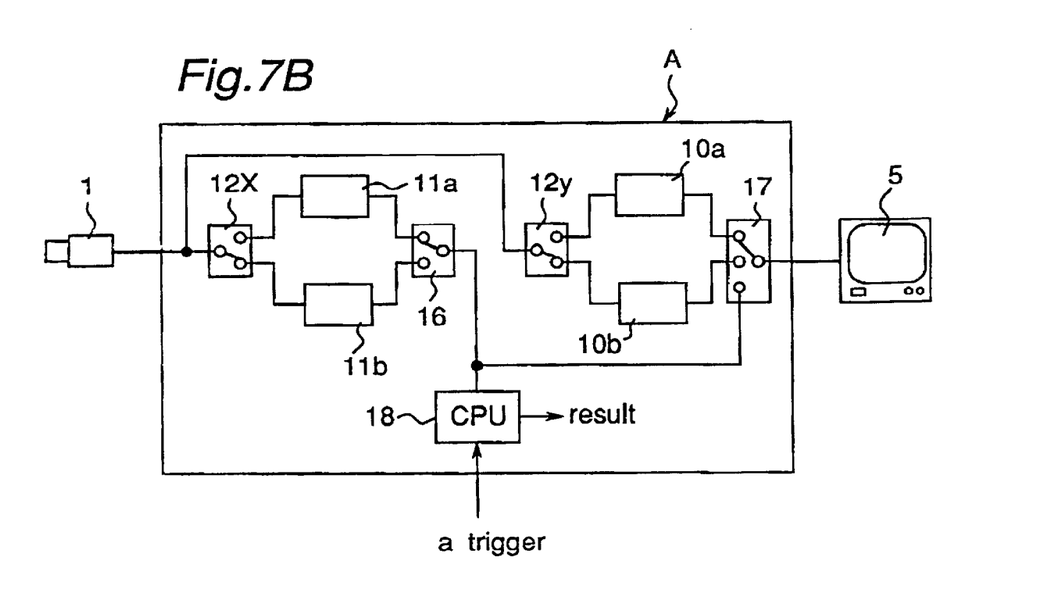

After the storing of the image data into the processing image memory 11a and the display image memory 10a is completed, when the next inspection start request signal is inputted and the image processing by means of the image data stored in the processing image memory 11b has been completed, the CPU 18 switches the selection switch circuits 12x, 12y, 16 and 17 in a manner as shown in FIG. 7B, thereby storing the image data from the TV camera 1 into the processing image memory 11b and the display image memory 10b . At the same time, the CPU 18 transfers the image data stored in the display image memory 10a to the display monitor 5 via the selection switch circuit 17 so as to display the image and starts the inspection process by means of the image data stored in the processing image memory 11a.

Figure 8A:
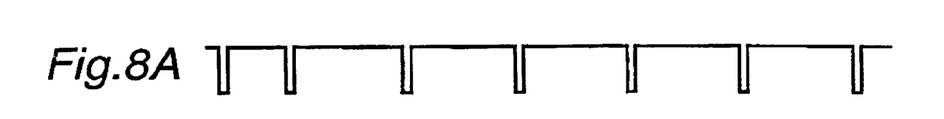
FIGS. 8A through 8E are timing charts for explaining an operation in the case where an inspection time is shorter than an image grabbing time in an alternate mode.
Figure 8B:
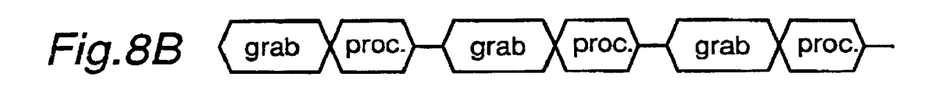
Figure 8C:
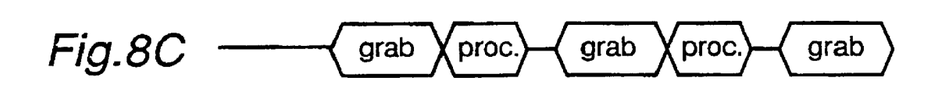
Figure 8D:
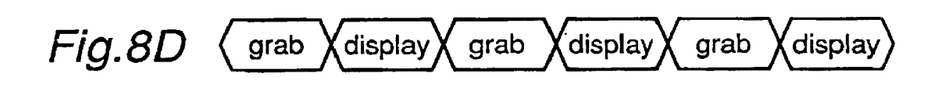
Figure 8E:
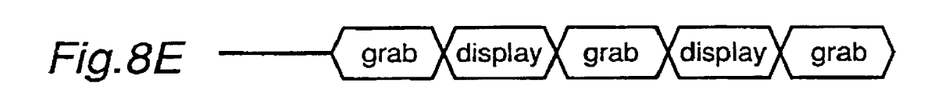

FIGS. 8A through 8E show timing charts of the inspection start request signal and the image data memories in the above case. FIG. 8A shows the timing chart of the inspection start request signal, FIG. 8B shows the timing chart of the storing of image data into the processing image memory 11a and the inspection process of those data, FIG. 8C shows the timing chart of the storing of image data into the processing image memory 11b and the inspection process of those data, FIG. 8D shows the timing chart of the storing of image data into the display image memory 10a and display of those data, and FIG. 8E shows the timing chart of the storing of image data into the display image memory 10b and display of those data.

Here is now considered the case where the inspection process time is longer than the image data storing time, i.e., the case where the storing of the image data into the processing image memory 11a and the display image memory 10a has been completed and the next inspection start request signal is inputted from the external trigger input of the CPU 18 but the inspection process by means of the image data of the processing image memory 11b has not been completed yet. In this case, the CPU 18 suspends the substantial input of the inspection start request signal and continues processing data of the processing image memory 11b. After the processing of the data of the processing image memory 11b is completed, the CPU releases the suspension and inputs the inspection start request signal so that the selection switch circuits 12x, 12y, 16 and 17 are switched in the aforementioned manner shown in FIG. 7B, stores the image data from the TV camera 1 into the processing image memory 11b and the display image memory 10b and starts the inspection process and display by means of the image data of the processing image memory 11a and the display image memory 10a.

Figure 9A:
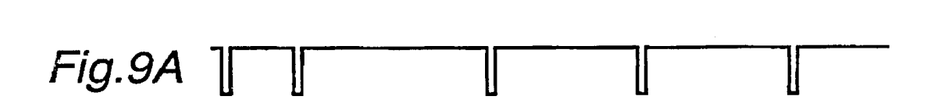
FIGS. 9A through 9E are timing charts for explaining an operation in the case where the inspection time is longer than the image grabbing time in the alternate mode.
Figure 9B:
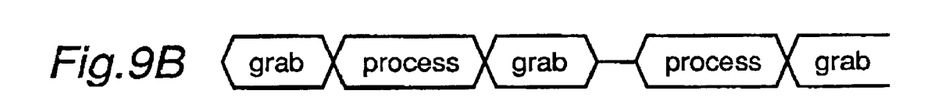
Figures 9C, 9D:
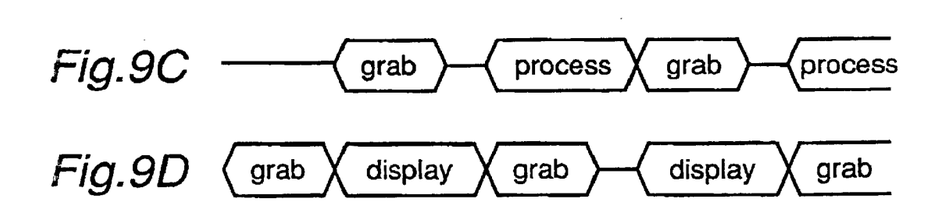
Figure 9E:
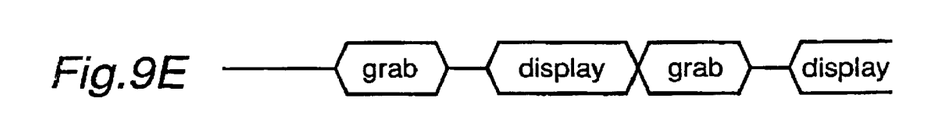

FIGS. 9A through 9E show timing charts of the inspection start request signal and the image data memories in the case where the aforementioned inspection process time is longer than the image data storing time. FIG. 9A shows the timing chart of the inspection start request signal, FIG. 9B shows the timing chart of the storing of image data into the processing image memory 11a and the inspection process of those data, FIG. 9C shows the timing chart of the storing of image data into the processing image memory 11b and the inspection process of those data, FIG. 9D shows the timing chart of the storing of image data into the display image memory 10a and display of those data, and FIG. 9E shows the timing chart of the storing of image data into the display image memory 10b and display of those data.

In the case where the storing of the image data into the processing image memory 11a and the display image memory 10a has been completed and the inspection process of the image data of the processing image memory 11b has been completed but the next inspection start request signal has not been inputted, yet, the CPU 18 waits for the input of the next inspection start request signal and switches the selection switch circuits 12x, 12y, 16 and 17 at the point of time when it receives the next inspection start request signal. That is, the CPU switches the selection switch circuits 12x, 12y, 16 and 17 as shown in FIG. 7B at the point of time when the inspection start request signal is inputted and stores the image data from the TV camera 1 into the processing image memory 11b and the display image memory 10b . At the same time, it transfers the image data stored in the display image memory 10a to the display monitor 5 via the selection switch circuit 17 so as to display the image and starts the inspection process by means of the image data of the processing image memory 11a.

As described above, the storing of the image data and the inspection process cannot be simultaneously executed since the image data has not been stored yet by the time at the first inspection according to the present embodiment. However, subsequently by alternately using the processing image memories 11a and 11b for two screen frames in a switching manner, the inspection process can be executed faster, than the prior art by the image data storing time. Furthermore, when a series of inspection processes are completed within the image data storing time, the inspection processes can be executed every image data storing process. For example, when the inspection process time as shown in FIGS. 8A through 8E is not longer than the image data storing time, the image data storing time becomes the inspection process time. Therefore, thirty times of inspection processes per second can be executed in the case of the frame grabbing (33.3 ms is required) and sixty times of inspection processes per second can be executed in the case of the field grabbing (16.7 ms is required).

(2) Normal mode

In the normal mode, a series of image data storing and inspection processes have been completed in the image data memories and thereafter the storing and inspection of the next image data are executed, similarly to the prior art.

In concrete, when the inspection start request signal is inputted to the external trigger input of the CPU 18, the CPU 18 controls the selection switch circuits 12x and 12y so as to simultaneously store the image data from the TV camera 1 into the processing image memory 11a and the display image memory 10a. When this data storing is completed, the CPU 18 switches the selection switch circuit 12x so as to disconnect the processing image memory 11a from the TV camera 1 and switches the selection switch circuit 16 so as to connect the memory to the CPU 18. Further, the CPU 18 switches the selection switch circuit 12y so as to also disconnect the display image memory 10a from the TV camera 1, transfers the image data stored in the display image memory 10a to the display circuit of the display monitor 5 via the selection switch circuit 17 so as to display it in the form of an image on the display monitor 5. When the next inspection start request signal is inputted after processing the image data stored in the processing image memory 11a for image processing, calculating and outputting the resulting data, then the CPU 18 stores the image data from the TV camera 1 into the processing image memory 11b and the display image memory 10b and subsequently repeats the above inspection process sequence.

Figure 10A:
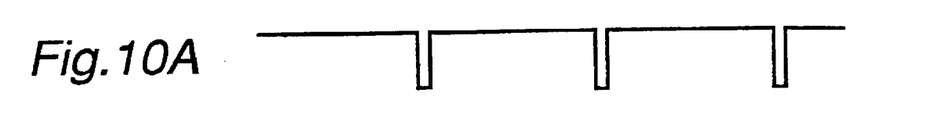
FIGS. 10A through 10E are timing charts for explaining an operation in a normal mode.
Figure 10B:
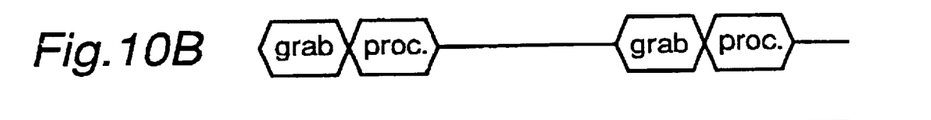
Figure 10C:
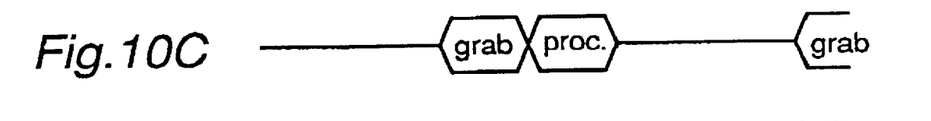
Figure 10D:
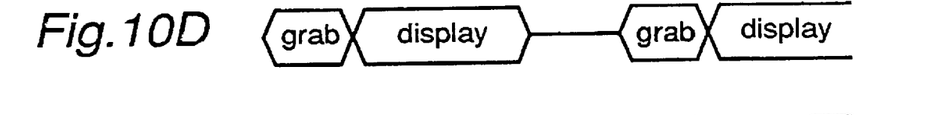
Figure 10E:
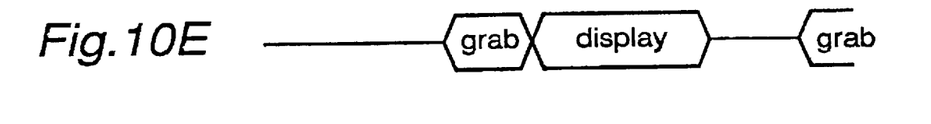

Timing charts in this case are shown in FIGS. 10A through 10E. FIG. 10A shows the timing chart of the inspection start request signal, FIG. 10B shows the timing chart of the storing of image data into the processing image memory 11a and the inspection process of those data, FIG. 10C shows the timing chart of the storing of image data into the processing image memory 11b and the inspection process of those data, FIG. 10D shows the timing chart of the storing of image data into the display image memory 10a and display of those data, and FIG. 10E shows the timing chart of the storing of image data into the display image memory 10b and display of those data. In the present mode, the next series of processes are executed after the completion of one series of processes as set forth. Although the processing time is not reduced differently from the alternate mode, it has a compatibility with the operation sequence of the prior art image processing inspection apparatus, therefore allowing easy replacement of the prior art.

(3) Through display mode

Figure 11A:
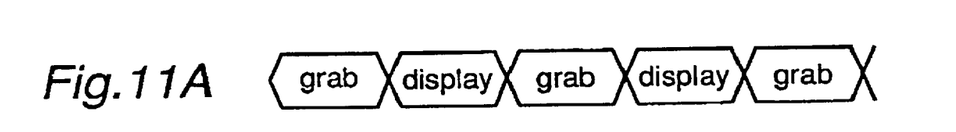
FIGS. 11A and 11B are timing charts for explaining an operation in a through display mode.
Figure 11B:
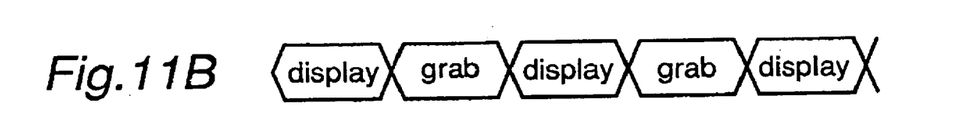

In the through display mode, the image from the TV camera 1 is stored alternately into the display image memories 10a and 10b provided for two screen frames and used for display. In concrete, the CPU 18 switches the selection switch circuit 12x to the display image memory 10a, switches the selection switch circuit 17 so as to connect the display image memory 10b to the display monitor 5 while the image data from the TV camera 1 is stored into the display image memory 10a and displays the data stored in the display image memory 10b. Subsequently, when the storing of data into the display image memory 10a is completed, the CPU connects the display image memory 10b to the TV camera 1 by means of the selection switch circuit 12x so as to store the image data from the TV camera 1 into the display image memory 10b and connects the display image memory 10a to the display monitor 5 by means of the selection switch circuit 17 so as to display the data. Timing charts in this case are shown in FIGS. 11A and 11B. FIG. 11A shows the timing chart of the storing of image data into the display image memory 10a and display of those data, and FIG. 11B shows the timing chart of the storing of image data into the display image memory 10b and display of those data. Since only the data display is executed in the present mode, neither data storing nor inspection process of the image data is executed on the processing image memories 11a and 11b.

As described above, the present mode allows the image picked up by the TV camera 1 to be displayed as a moving picture in real time by switching the image data memories, and this is effective in achieving image display when no inspection start request signal is inputted.

Fourth Embodiment

Figure 12:
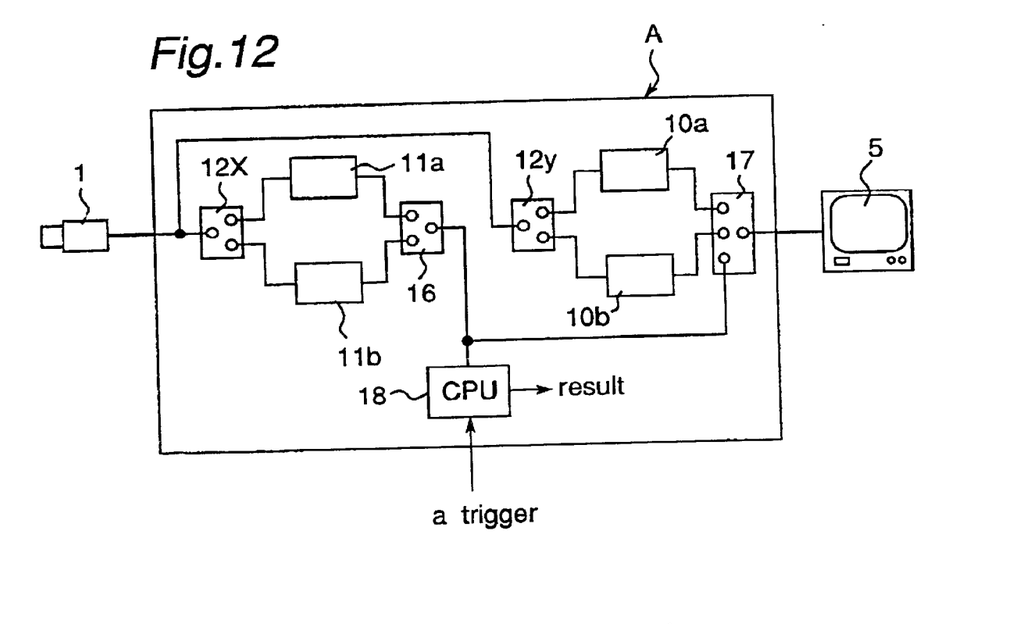
FIG. 12 is a schematic diagram of an image processing inspection apparatus according to a fourth embodiment of the present invention.

FIG. 12 shows the construction of an image processing inspection apparatus according to the present embodiment. The image processing inspection apparatus of the present embodiment has the same construction as that of the image processing inspection apparatus of the third embodiment as illustrated, i.e., it has three operation modes explained in connection with the third embodiment, and the image processing and image display are made to coincide with each other at the time of switching between these modes.

As set forth, in the normal mode and the alternate mode, the image display is not updated until the inspection start request signal is inputted from the external trigger input. In this case, the display image becomes a still picture. In the following description, such display will be referred to as "memory image display". Further, the operation mode in this case will be referred to as a "memory image mode". In contrast to this, display which enables moving picture display by the switching between the image data memories and does not depend on the inspection start request signal will be referred to as "through image displays".

In the memory display mode (normal mode or alternate mode), the memory image display is achieved, when the image data of the processing image memory and the displayed image data of the display image memory are quite identical to each other. Further, in the through display mode, the through image display is achieved, when the image data is stored only into the display image memory and not stored in the processing image memory. Therefore, in the through display mode, the contents of the display image memory have been updated, however, the contents of the processing image memory have not been updated. Therefore, the contents of the display image memory and the contents of the processing image memory do not coincide with each other.

Therefore, when the display mode is changed from the memory display mode to the through display mode, i.e., when the image display is changed from the memory image display to the through image display, the image data from the TV camera 1 is stored into only the display image memory. Therefore, the contents of the processing image memory and the contents of the display image memory do not coincide with each other. If the display mode is set back to the memory display mode, the image that has been stored in the processing image memory and used for the inspection differs from the image that is stored in the display image memory and is used for display, which is not favorable.

Then, the present embodiment takes the measure of copying the image data from the processing image memory to the display image memory when the operation of switching the display mode from the through display mode to the memory display mode, thereby making the processing image and the display image coincide with each other. The operation will be described in concrete below.

Figure 13:
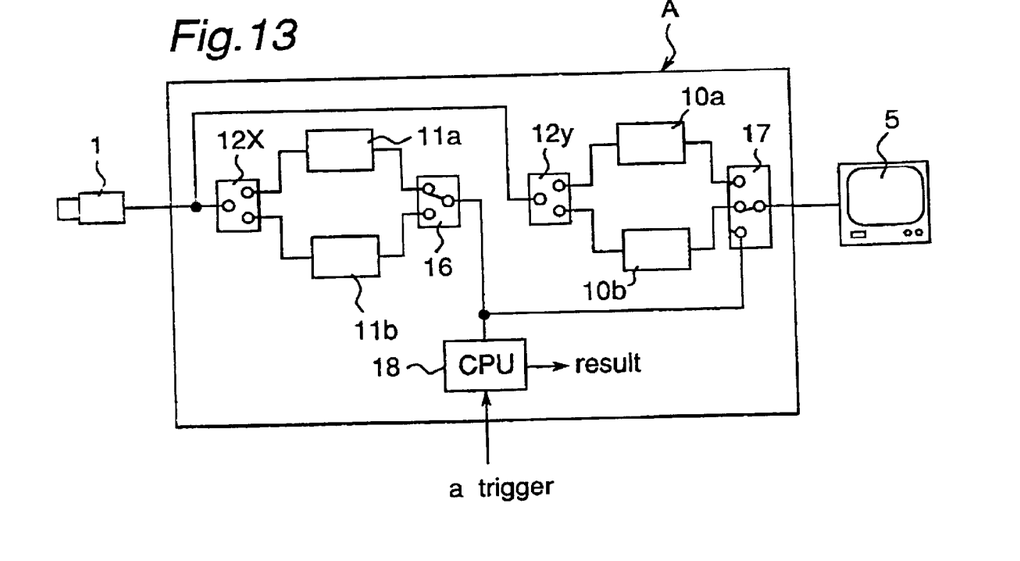
FIG. 13 is a view for explaining the operation of the image processing inspection apparatus of the fourth embodiment when selection switches are switched.

In the case where the image data of the processing image memory 11a is processed at the point of time when the display mode is switched from the through display mode (through image display) to the memory display mode (memory image display), the CPU 18 switches the selection switch circuits 16 and 17 in a manner as shown in FIG. 13 so as to read the image data from the processing image memory 11a via the selection switch circuit 16 and write the image data into the display image memory 10a via the selection switch circuit 17. When this writing is completed, the CPU 18 switches the selection switch circuit 17 so as to connect the display image memory 10a to the display monitor 5 and execute image display by means of the copied image data. By this operation, the processing image and the display image can be made to coincide with each other.

The time required for copying the image data of one screen frame has a considerable span (e.g., tens to hundreds of milliseconds are required) which cannot be ignored as compared with the time required for the storing of the image data, image processing or calculation and outputting Therefore, if the inspection start request signal is inputted from the external trigger input to the CPU 18 and the signal cannot be received, start of the next inspection will be delayed until the completion of the copying, which is impracticable. Therefore, the image processing inspection apparatus of the present embodiment takes the measure of consistently monitoring the inspection start request signal inputted from the external trigger input while the CPU 18 is copying the image data stored in the processing image memory 11a (or 11b) into the display image memory 10a (or 10b). In practice, when the inspection start request signal is input and an interrupt request is dispatched to the CPU 18, the CPU 18 stops the copying process at the point of time when the CPU 18 accepts the interrupt (the image data is copied halfway at this point of time) and simultaneously stores new image data from the TV camera 1 into the processing image memory 11a and the display image memory 10a via the selection switch circuits 12x and 12y. After the storing of the image data is completed, the CPU 18 controls the selection switch circuit 17 so as to transfer the image data of the display image memory 10a to the display monitor 5 for the execution of image display.

In the present embodiment, when the operation of switching the image display from the through image display to the memory image display (the image data of the TV camera 1 is displayed in the form of a still picture in this stage) as described above, the image that has been displayed on the display monitor 5 in the form of the memory image display before the switching to the through display mode is displayed as the memory image to be displayed on the display monitor 5. Furthermore, in order to achieve this function, when the external inspection start request signal is inputted while the image data is copied from the processing image memory 11a (or 11b) to the display image memory 10a (or 10b), the CPU 18 stops the copying operation and immediately grabs the next image transferred from the TV camera 1 into both the processing image memory 11a (or 11b) and the display image memory 10a (or 10b) for the execution of the inspection process and image display.

Fifth Embodiment

Here will be described an image processing inspection apparatus provided with processing image memories and display image memories for three screen frames.

Figure 14:
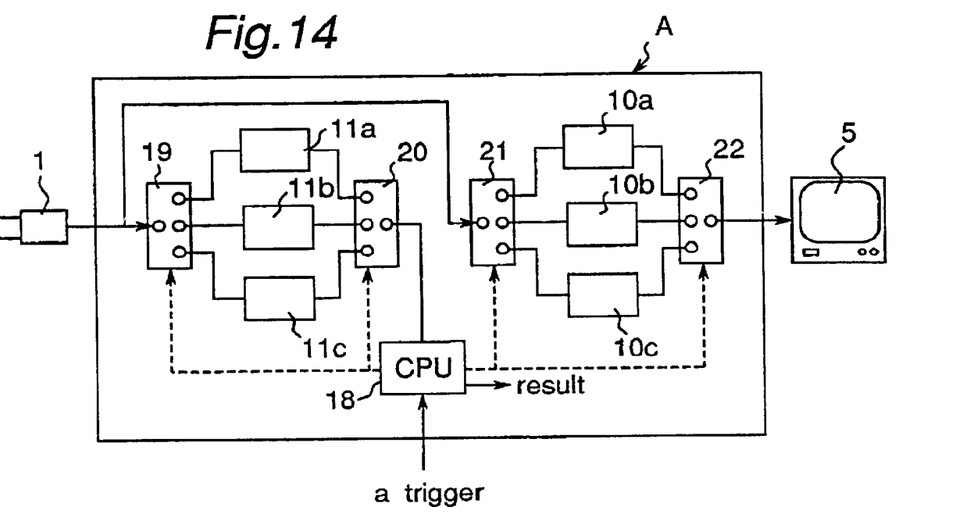
FIG. 14 is a schematic diagram of an image processing inspection apparatus according to a fifth embodiment of the present invention.

FIG. 14 shows a schematic block diagram of the image processing inspection apparatus of the present embodiment.

The image processing inspection apparatus A of the present embodiment has processing image memories 11a, 11b and 11c, display image memories 10a, 10b and 10c, selection switch circuits 19 through 22 for switching these memories and a CPU 18 for totally controlling the operation of the image processing inspection apparatus. In this image processing inspection apparatus A, the processing image memory 11a and the display image memory 10a constitute a first memory pair, the processing image memory 11b and the display image memory 10b constitute a second memory pair, and the processing image memory 11c and the display image memory 10c constitute a third memory pair. These memory pairs are sequentially switched by the selection switch circuits 19 through 22, so that specified memories are selected and grabbing of image data, display and inspection process are executed. In the present embodiment, the memory pairs are selected sequentially cyclically, for example, in the order of the first memory pair the second memory pair the third memory pair the first memory pair. The operation will be described in concrete below.

First, the first memory pair is selected by the selection switch circuits 19 and 21, so that the image data from the TV camera 1 is stored into the processing image memory 11a and the display image memory 10a. At the same time, the third memory pair is selected by the selection switch circuits 20 and 22, so that the data stored in the processing image memory 11c are read to the CPU 18 and a specified inspection process is executed. Further, the data stored in the display image memory 10c are displayed on the display monitor 5.

When the grabbing of the image data is completed and the inspection process of the above data is completed, the selection switch circuits 19 and 21 are switched for the selection of the second memory pair, so that the image data from the TV camera 1 is stored into the processing image memory 11b and the display image memory 10b. At the same time, the first memory pair is selected by the selection switch circuits 20 and 22, so that the data stored in the processing image memory 11a is read to the CPU 18 and the specified inspection process is executed. Further, the data stored in the display image memory 10a is displayed on the display monitor 5.

When the grabbing of the image data is completed and the inspection process of the above data is completed, the selection switch circuits 19 and 21 are switched for the selection of the third memory pair, so that the image data from the TV camera 1 is stored into the processing image memory 11c and the display image memory 10c. At the same time, the second memory pair is selected by the selection switch circuits 20 and 22, so that the data stored in the processing image memory 11b is read to the CPU 18 and the specified inspection process is executed. Further, the data stored in the display image memory 10b is displayed on the display monitor 5. Subsequently, the memory pairs are sequentially switched and the processing is executed.

Thus, by sequentially selectively using two of the three memory pairs and executing the grabbing of the image data, inspection and display, the processing time of the entire image processing inspection apparatus can be reduced similarly to the aforementioned embodiments. Furthermore, by executing the switching from the display image memory that is currently selected to the display image memory of the memory pair that is not selected by means of the selection switch circuit 22 in displaying the data on the display monitor 5, the image processing result in the previous time can be displayed again, and this also allows the current inspection result to be compared with the previous inspection result.

Although the three memory pairs are sequentially switched for use in the above description, it is acceptable to select two memory pairs out of the three memory pairs, alternately switch these memory pairs as in the first through fourth embodiments, execute the grabbing of the image data, inspection and display, store a specified image in the remaining memory pairs and execute display as occasion demands. For example, the first and second memory pairs are alternately switched for the execution of the grabbing of the image data, display and so forth, and the third memory pair is made to preparatorily store the image to be a reference for the inspection (e.g., the target of a good product). When there is dispatched a demand from the user via the input device such as the keypad 7 or the like, by switching the selection switch 22 as occasion demands for the selection of the display image memory of the third memory pair, the image data to be the reference can be displayed on the display monitor 5. As described above, a plurality of memory pairs may be used through switching in accordance with an arbitrary timing on the basis of the user's demand or the like.

Furthermore, the same operation and effect as those of the aforementioned embodiments can be obtained without any problem even when image data memories and image display memories for not fewer than four screen frames are used similarly to the aforementioned embodiments.

It is to be noted that the present invention has been described in connection with the specified embodiments, however, many other modifications, changes and uses will be apparent to those skilled in the art. Therefore, the present invention is not limited by the specific disclosure provided herein but limited only to the scope of the attached claims.

What is claimed is:

1. An image processing inspection apparatus comprising:
   a TV camera;
   a plurality of image-processing-use image memories which are provided for a plurality of screen frames and each of which operates to store image data of each screen frame grabbed from said TV camera for use in a specified inspection process;
   a plurality of display-use image memories which are provided for a plurality of screen frames and each of which operates to store image data of each screen frame grabbed from said TV camera for use in being displayed;
   a display monitor for displaying the image data stored in one of said display-use image memories;
   a CPU for executing specified image processing on the data stored in one of said image-processing-use image memories; and
   a switch means for selectively connecting for each screen frame one of said image-processing-use image memories with said TV camera and said CPU, and one of said display-use image memories with said TV camera and said display monitor.

2. An image processing inspection apparatus as claimed in claim 1, wherein
   said display-use image memories are provided for two screen frames; and
   said switch means executes switching between a period in which one display-use image memory is connected to the TV camera for the execution of image data storing and the other display-use image memory is simultaneously connected to the display monitor for the execution of image display and a period in which the other display-use image memory is connected to the TV camera for the execution of image data storing and the one display-use image memory is simultaneously connected to the display monitor for the execution of image display.

3. An image processing inspection apparatus as claimed in claim 1, further comprising;
   a graphic data memory which stores therein graphic data to be displayed as superimposed on the image data stored in said display-use image memory; and
   a look-up table having a plurality of data conversion means which are selected in an alternative way arid operate to superimpose the graphic data stored in said graphic data memory on the image data to be displayed.

4. An image processing inspection apparatus as claimed in claim 3, wherein
   said look-up table comprises: a data conversion means for displaying the image data by binarizing the data; and a data conversion means for displaying the image data in the form of a gray scale image.

5. An image processing inspection apparatus as claimed in claim 3, wherein
   said look-up table can rewrite said data conversion means in order to obtain a desired data conversion format.

6. An image processing inspection apparatus as claimed in claim 1, wherein
   the image data is stored into one image-processing-use image memory and an inspection process is executed simultaneously by means of another image-processing-use image memory in which the image data in the preceding time has been stored.

7. An image processing inspection apparatus as claimed in claim 1, further comprising a means for setting a mode by switching between
   a normal mode in which the image data is stored into the image-processing-use image memory and an inspection process is executed after the storing is completed,
   an alternate mode in which the image data is stored into one image-processing-use image memory and an inspection process is executed simultaneously by means of another image-processing-use image memory in which the image data in the preceding time has been stored, and
   a through display mode in which the image data from the TV camera is selectively stored into the display-use image memory for a plurality of screen frames and, while the image data is being stored, the image data stored in the display-use image memory in which the image data in the preceding time has been stored is displayed on the display monitor.

8. An image processing inspection apparatus as claimed in claim 7, wherein
   the image data stored in said image-processing-use image memory is copied into said display-use image memory and thereafter the image data copied into said display-use image memory is displayed when said through display mode is switched to said alternate mode or said normal mode.

9. An image processing inspection apparatus as claimed in claim 8, wherein
   the copying is stopped and next image data transmitted from the TV camera is stored in said image-processing-use image memory and said display-use image memory when a signal requiring the start of the inspection process is externally inputted while the image data stored in said image-processing-use image memory is copied into the display-use image memory.

* * * * *

UNITED STATES PATENT AND TRADEMARK OFFICE
CERTIFICATE OF CORRECTION

PATENT NO. : 5,875,004
DATED : February 23, 1999
INVENTOR(S) : T. YAMANE et al.

It is certified that error appears in the above-identified patent and that said Letters Patent is hereby corrected as shown below:

At column 16, line 10 (claim 3, line 7) of the printed patent, "arid" should be ---and---.

Signed and Sealed this

Sixteenth Day of May, 2000

Attest:

Q. TODD DICKINSON

*Attesting Officer*        *Director of Patents and Trademarks*